United States Patent

[11] 3,534,767

[72] Inventor  Alvis C. Swinney
              c/o Swinney Machine Shop, Route 1, Box
              204D, Odessa, Texas 79760
[21] Appl. No. 671,628
[22] Filed     Sept. 29, 1967
[45] Patented  Oct. 20, 1970

[54] CHECK VALVE FOR A FLOAT SUB
     5 Claims, 6 Drawing Figs.
[52] U.S. Cl. ................................................. 137/375,
                       137/515.7, 137/533, 137/13, 251/362
[51] Int. Cl. .................................................. F16k 15/04
[50] Field of Search ............................................ 137/515,
          515.3, 515.5, 515.7, 533.13, 533.15, 519.5,
          533.19, 375; 166/224, 225; 251/362, 361, 363

[56]                 References Cited
                UNITED STATES PATENTS
1,078,347  11/1913  Haas ............................. 137/519.5
1,947,257   2/1934  Fritz ............................. 251/361
2,877,792   3/1959  Tybus ........................... 130/512.1
3,059,898  10/1962  Carlson ......................... 251/383

Primary Examiner—William F. O'Dea
Assistant Examiner—Howard M. Cohn
Attorney—Marcus L. Bates ABSTRACT: A check valve for a float sub or the like which may be readily disassembled for cleaning or overhaul. The valve is made into two main body portions which may be screwed together to form an internal chamber which houses a ball type valve element, stop means, liner, and valve seat. The inner wall surface of the stop means, liner, and valve seat which are contacted by fluid flowing through the chamber are coated with a resilient material which is resistant to errosion. The main body portions hold the ball, stop, liner, and seat in assembled relationship with respect to each other.

Patented Oct. 20, 1970

3,534,767

*INVENTOR.*
ALVIS C. SWINNEY
*BY*
MARCUS L. BATES 3,534,767

1

CHECK VALVE FOR A FLOAT SUB

BACKGROUND OF THE INVENTION

In drilling oil wells, a high density fluid, called "mud", is usually pumped through the drill string in order to aid the bit in drilling through the ground. Sometime a high pressure strata will be penetrated by the drill bit. This action can cause reverse circulation to occur and bring about a dangerous condition sometime referred to as "blow out". This dangerous condition can be minimized by the provision of a suitable check valve means near the drill bit. Such a check valve must be made into the same configuration as the "subs" which connect the various joints of drill pipe together into a string of pipe. Therefore, the check valve housing must be provided with a male and female thread in order to be interposed in series relationship within the drill string.

When running drill pipe, production tubing, and casing into a bore hole, the extreme length of pipe is quite heavy and therefore is difficult to safely manipulate unless heavy duty equipment and extreme caution is exercised. To simplify running a heavy string of pipe into a well bore filled with drilling mud or other fluid, it is advantageous to take advantage of the buoyancy of the hollow pipe in order to float a portion of the weight of the pipe as it is being lowered into the bore hole. It is therefore expedient to provide the lower extremity of a string of pipe with a float sub, wherein the sub essentially is a collar which connects joints of the pipe into a string. The float sub is generally placed near the lower extremity of the pipe and is in the form of a check valve which prevents the upward flow of fluid while permitting the downward flow of fluid.

In drilling a bore hole using the "air drilling method", an occasional pocket of water, that is, a water-bearing strata, may be penetrated by the drill bit. Ordinarily, the water will be forced from the hole where it is dispersed along with the debris from the drilling cuttings into a waste pit or other convenient disposal area. However, should the drilling operation suddenly be interrupted when an aquiferous stratum is encountered, the sudden downward surge of water will act much like a water hammer, thereby causing a reverse circulation of fluid. This reverse circulation of fluid is sometime of a sufficient intensity to cause water or fluid bearing debris to flow all the way back into the compressors, thereby causing damage or malfunction thereof. Therefore it is desirable to incorporate a check valve means, such as the float sub of the instant invention, above the ground and near the compressors where reverse circulation of fluid is precluded.

SUMMARY

It is therefore desirable to provide a one-way check valve means, hereinafter called a float sub, which may be used both above ground and below ground in order to prevent reverse flow of fluids.

It is also desirable to provide a float sub used in conjunction with fluid flow through a drill stem which is able to withstand the erosive action of drilling fluids for an extended length of time.

Accordingly, a primary object of the present invention is to provide a float sub which can withstand the erosive action of fluids associated with bore holes for an extended length of time.

Another object of the present invention is the provision of a float sub which may be readily disassembled for cleaning or overhaul.

A still further object of the present invention is the provision of a check valve assembly having replaceable parts therein which can be readily disassembled and overhauled.

Another object of the present invention is the provision of a float sub having a minimum of moving parts therein and additionally including replaceable parts which are highly resistant to the erosive action of fluids generally associated with a bore hole.

2

A further object of the present invention is the provision of a float sub which can be readily disassembled to enable field repairs of the critical components thereof.

The above objects are attained in accordance with the present invention by the provision of a check valve comprised of two major body parts which may be screwed together in a manner to provide a cage which maintains a valve seat, valve stop, valve liner, and a ball check valve suitably assembled therein.

DESCRIPTION OF THE PREFERRED EMBODIMENTS

Figure 1:
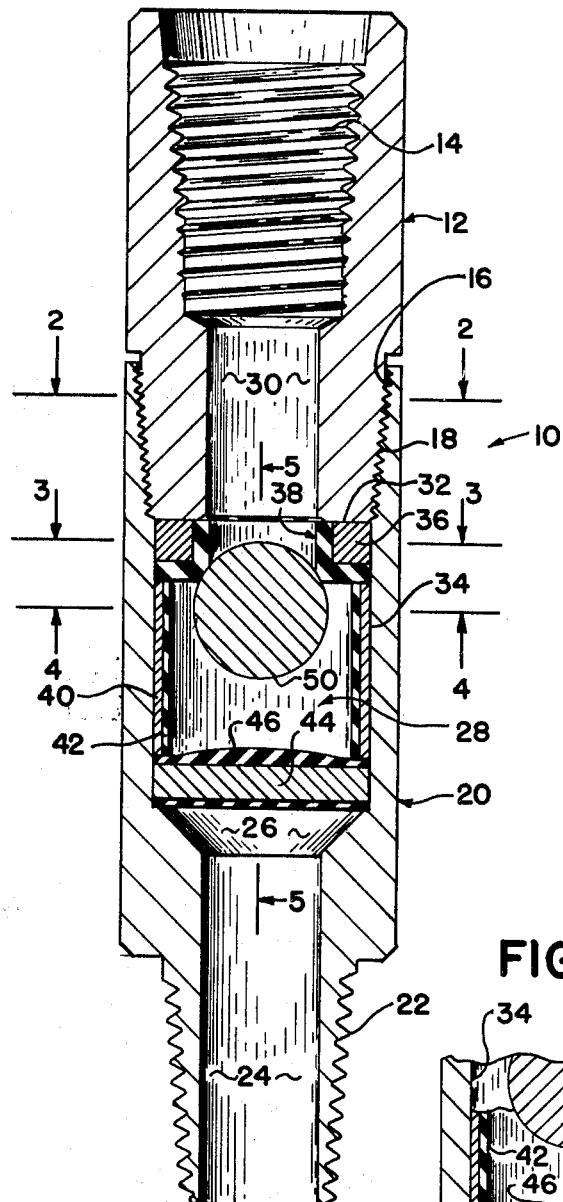
FIG. 1 is a longitudinal cross-sectional view of the present invention.
Figure 2:
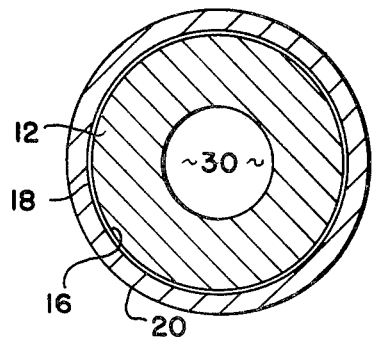
FIG. 2 is a cross-sectional view taken along line 2-2 of FIG. 1.
Figure 3:
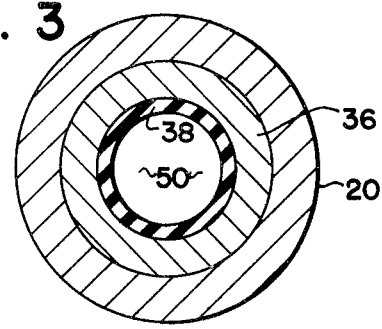
FIG. 3 is a cross-sectional view taken along line 3-3 of FIG. 1.
Figure 4:
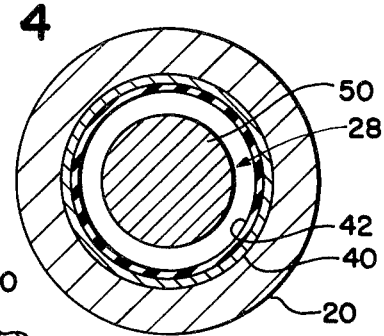
FIG. 4 is a cross-sectional view taken along line 4-4 of FIG. 1.
Figure 5:
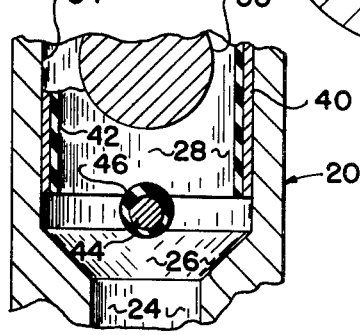
FIG. 5 is a cross-sectional view taken along line 5-5 of FIG. 1.

Looking now to the details of FIG. 1, in conjunction with the remaining figures, wherein there is seen generally illustrated by the arrow at numeral 10 a float sub having an upper body 12 which is provided with threads 14 at the upper extremity thereof. Threads 16 cooperate with threads 18 to thereby removably affix the upper body to a lower body 20. Threads 22 are seen at the lower depending end of the sub. Threads 14 and 22 are adapted to be received by two joints of drill pipe by merely screwing the float sub 10 in series relationship into a string of pipe. The longitudinally extending flow path through the sub is comprised of passageway 24 which diverges at 26 into a valve chamber 28. The valve chamber reduces in size into a passageway 30. The lower depending end of the upper body is provided with a face 32 which forms an annular shoulder. The inside peripheral wall surface of the lower body which forms the valve chamber is seen at 34. A valve seat 36, which is circular in form, is received in close tolerance relationship by the annular shoulder and the before mentioned wall of the valve chamber, with the seat having a layer of resilient material, such as rubber, vulcanized or otherwise attached thereon to provide a resilient valve seat generally indicated by the arrow at numeral 38. Insert 40 is essentially of the same outside diameter as seat 36, and likewise is provided with a vulcanized layer of resilient material 42 thereon. A pin 44 of round cross-sectional area having a layer of resilient material 46 thereon abuts the lowermost portion of the chamber 28. The resilient material 46 is unsymmetrically vulcanized onto the pin in a manner as best seen in FIGS. 1 and 5.

A ball 50 is caged within the chamber 28 by means of the before mentioned pin, the valve seat, and the side walls 42.

Figure 6:
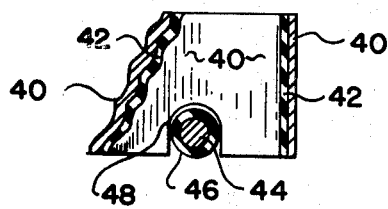
FIG. 6 is a fragmentary elevation showing a modification of a portion of the device seen in FIGS. 1 and 5.

As seen in the modification of FIG. 6, the insert 40, 42 may be provided with a cutout 48 which receives the before mentioned stop means 44 and 46 in tight fitting relationship therein. The insert receives a similar cutout on the opposite marginal edge portion to thereby enable the insert to enclose each terminal end of the pin as the insert is pressed to a bottoming position within the chamber. This expedient precludes rotational movement of the pin and insert while at the same time lines the entire valve chamber.

The device of FIG. 1 is disassembled by first unscrewing the upper body from the lower body, thereby exposing the valve seat 38. A drive pin or bar can then be placed through the passageway 24 and pin 26 driven toward the ball 50, thereby forcing the seat, insert, and ball out of the device as the pin 44, 46 is forced from the chamber in an outward direction. A new pin 44, 46 is then replaced within the chamber, the insert or sleeve 40, 42 dropped into position, a ball 50 inserted into the lined chamber where it rests against the pin 44, 46; followed by the replacement of a new seat 38. The upper body can then be screw fitted onto the lower body by mating the threads 16 and 18 together whereby the shoulder 32 will press the valve seat 36 against the inset, which in turn is pressed against the pin 44, 46; thereby holding the various new internal parts together in the assembled relationship of FIG. 1.

The assembled valve of FIG. 1 is illustrated as being in the closed position, which is the position assumed by the ball should fluid flow occur through passageway 24 towards passageway 30, *i.e.*, reverse circulation. Flow of fluids from passageway 30 through passageway 24 causes the ball valve element 50 to move to the opened position, whereupon the ball then rests against the resilient material 46 of pin 44. As seen in FIGS. 1 and 5, the resilient material is applied to the pin 44 in an unsymmetrical manner whereupon an abundance of material is left closely adjacent the ball. This provides an excess of material which must be eroded away before the metal 44 is exposed by the action of the ball repeatedly contacting the stop means. The details of fabricating a vulcanized pin of this configuration is within the comprehension of those skilled in the art, and accordingly will not be discussed in further detail.

By providing the entire cage which houses the ball with a coating of resilient material, the life of the valve is greatly extended. The resilient material is preferably a hard rubber-like material which may be vulcanized directly onto the various metal parts. It should be understood however, that any high abrasion resistant natural or synthetic rubber or rubber-like material, including nylon can be used in lieu of the rubber.

By fabricating the vital components of the valve in the above illustrated manner, the valve can be economically overhauled at the drilling site by using conventional tools.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A check valve assembly having an upper body removably attached to a lower body, means forming a flow passageway longitudinally through said valve assembly, means forming a valve element chamber within said valve assembly, said chamber being part of said passageway:

means forming a valve element stop, a valve seat, and a valve element in the form of a ball located between said seat and said stop;

said valve element stop including an elongated bar located at the lower extremity of said valve element chamber; means forming a layer of resilient material about said bar, said bar being arranged perpendicularly with respect to the flow passageway, said passageway adapted to conduct flow of fluid through said chamber;

said chamber including a removable liner comprised of an upstanding cylinder having the inside peripheral surface thereof formed of a resilient material;

said liner includes means forming a pair of spaced apart cutouts therein, said cutouts being located 180° apart, said valve element stop having a portion thereof received within said cutouts;

said valve seat including a removable member, which is circular in form, having an inside face and a lower face;

said inside and lower faces being formed of a resilient material;

said valve element stop being releasably held in the lower extremity of said chamber by said liner, said liner being releasably held circumferentially disposed within said chamber by said valve seat, said valve seat being releasably held at the upper extremity of said chamber by said upper body; whereby:

said valve element cooperates with said valve seat and said stop to permit flow through said passageway in one direction and to prevent flow through said passageway in another direction.

2. The device of claim 1 wherein the upper body is provided with threads about the lower outer peripheral wall surface thereof, and;

the lower body is provided with threads about the upper inside peripheral wall surface of said passageway which cooperate with the threads on said upper body, whereby;

said upper and lower bodies can be unfastened from each other to thereby permit the removal of said seat, ball valve element, liner, and stop.

3. The device of claim 1 wherein said elongated bar is in the form of a rod, said resilient material is unsymmetrically applied to the outer surface of said rod with the major portion of the resilient material being located towards said valve element.

4. The improvement of claim 1 wherein said resilient material is unsymmetrically applied to said rod with the major portion of the resilient material being located towards said valve element.

5. The improvement of claim 1 wherein said rod is round in cross section; and said resilient material is unsymmetrically applied to said rod with the major portion of said resilient material being located towards said valve element.